United States Patent [19]
Butera et al.

[11] Patent Number: 6,164,784
[45] Date of Patent: Dec. 26, 2000

[54] MOTOR-VEHICLE REAR VIEW MIRROR HAVING AN ANTI-GLARE SHAPE MEMORY ACTUATING DEVICE

[75] Inventors: Francesco Butera, Turin; Stefano Alacqua, Rivoli-Cascine Vica (Turin); Andrea Saccagno, Turin, all of Italy

[73] Assignee: Magneti Marelli, S.p.A., Milan, Italy

[21] Appl. No.: 09/425,164

[22] Filed: Oct. 22, 1999

[30] Foreign Application Priority Data

Dec. 23, 1998 [IT] Italy ................. TO98A1079

[51] Int. Cl.[7] .................................................. G02B 5/08
[52] U.S. Cl. ..................... 359/603; 359/604; 359/841; 359/871; 359/872
[58] Field of Search .................... 359/603, 604, 359/265, 266, 273, 841, 871, 872; 248/476, 483, 491

[56] References Cited

U.S. PATENT DOCUMENTS

| | | | |
|---|---|---|---|
| 4,626,085 | 12/1986 | Suzuki | 359/603 |
| 4,726,656 | 2/1988 | Schofield et al. | 359/841 |
| 5,166,832 | 11/1992 | Zychowich | 359/841 |

*Primary Examiner*—Mohammad Y. Sikder
*Attorney, Agent, or Firm*—Sughrue, Mion, Zinn, Macpeak & Seas, PLLC

[57] ABSTRACT

A motor-vehicle inner rear view mirror comprises a supporting body a reflective plate which is movable, against the action of spring means, to an anti-glare position following activation of a shape memory wire.

4 Claims, 2 Drawing Sheets

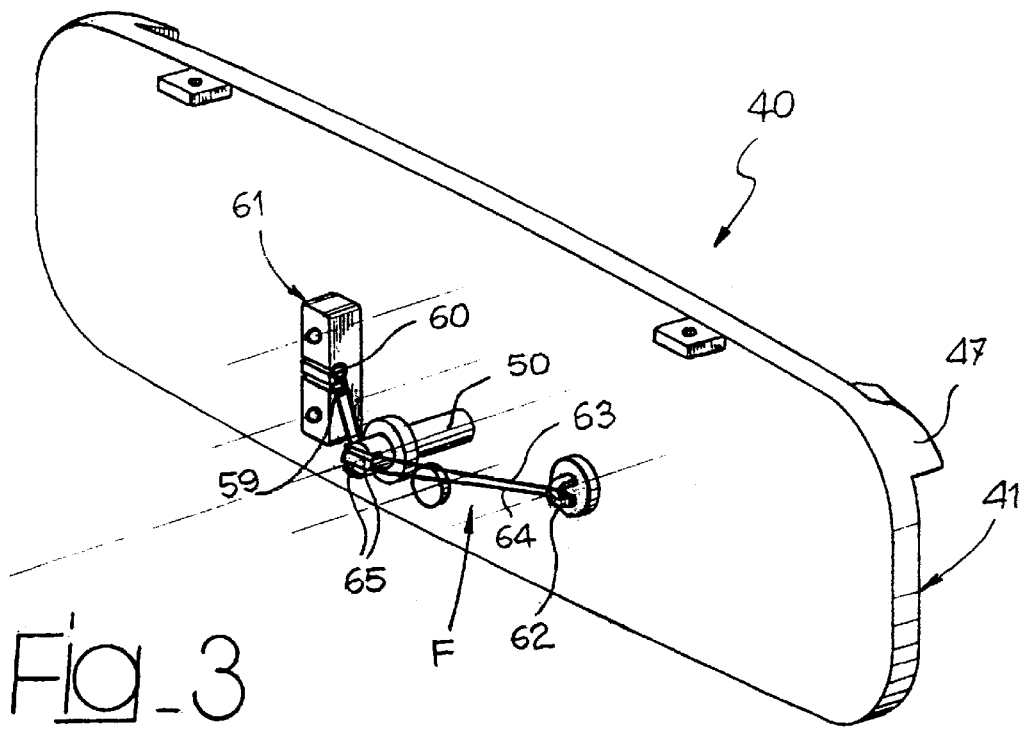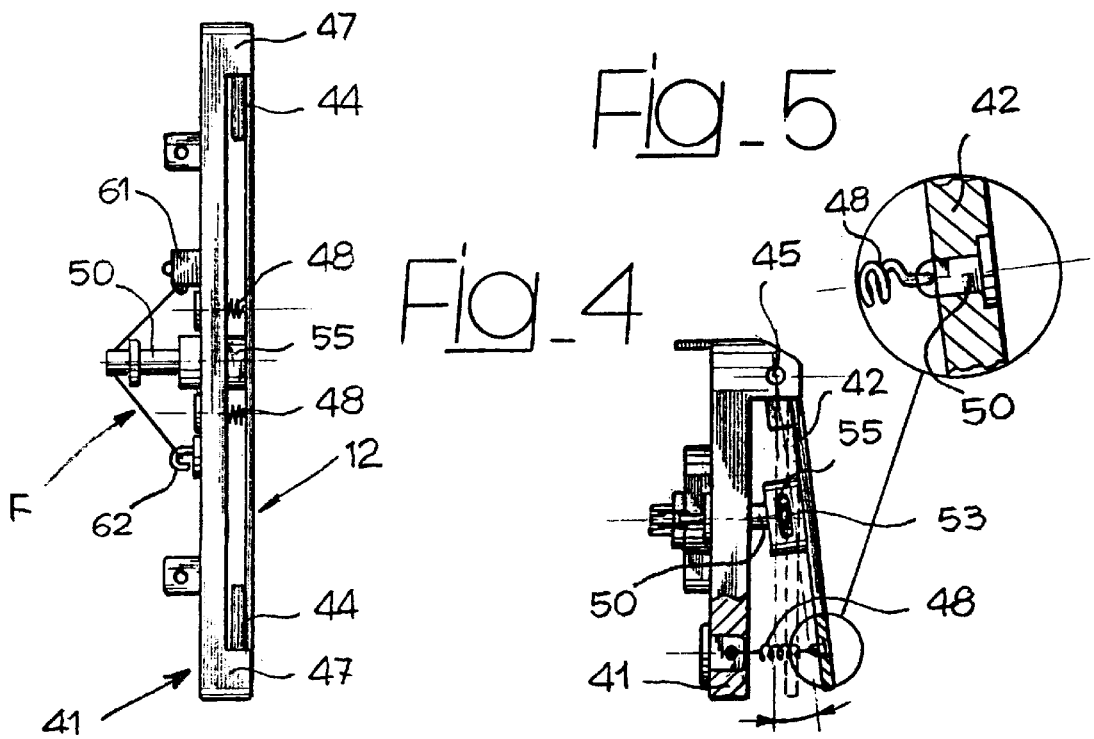

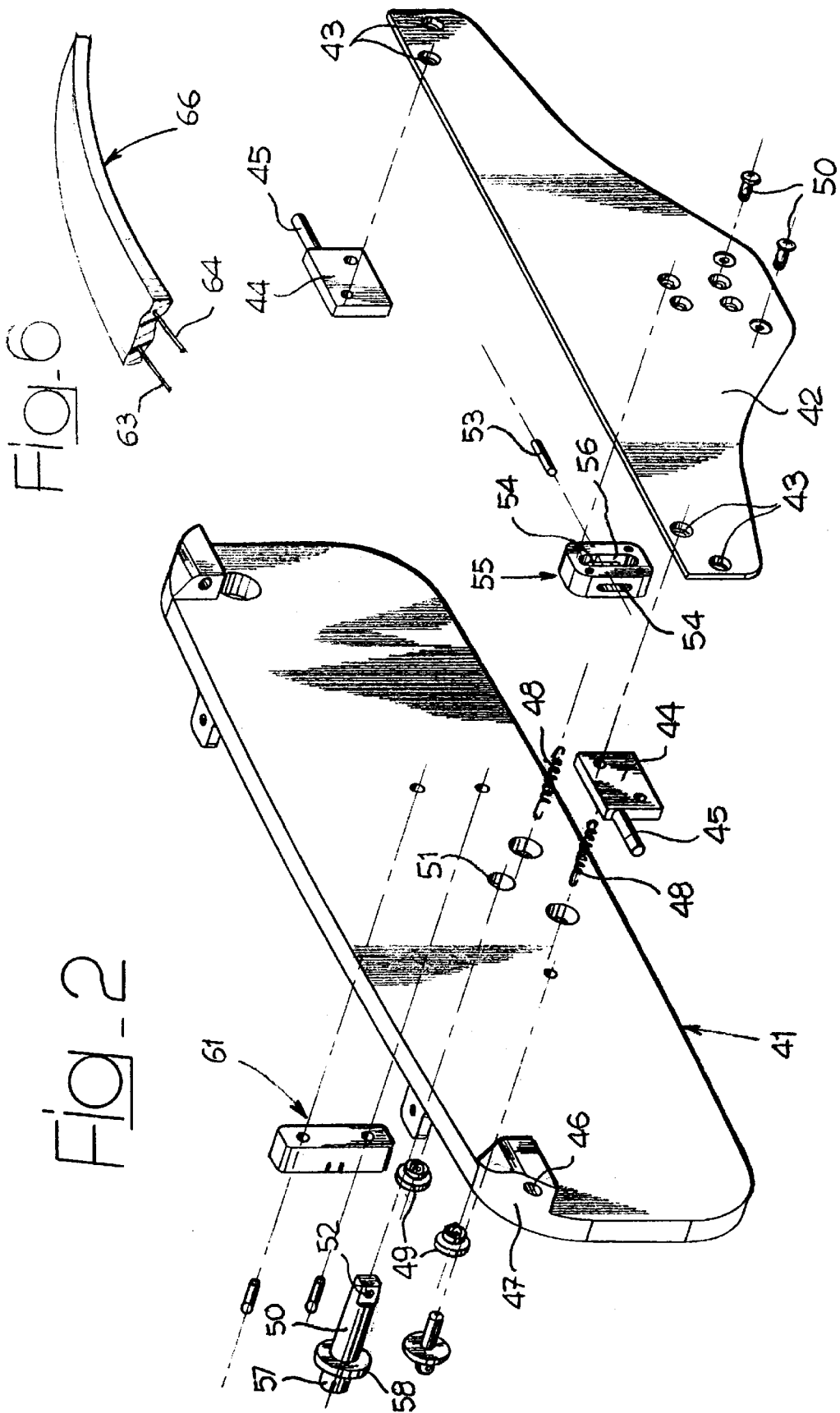

MOTOR-VEHICLE REAR VIEW MIRROR HAVING AN ANTI-GLARE SHAPE MEMORY ACTUATING DEVICE

BACKGROUND OF THE INVENTION

The present invention relates to motor-vehicle rear view mirrors of the type comprising a supporting body and a reflective plate pivotally mounted to the supporting body and movable between a position of normal use and an anti-glare position.

The rear view mirror located inside the passenger compartment of the motor-vehicle is conventionally provided with a manual control lever for controlling movement of the reflective plate between its two above identified operative positions.

A solution is also known and has been used which makes use of an electro-chromic layer on the mirror which is automatically darkened when light sensor means located at the front and at the rear of the mirror detect a light from rear much greater than the light at the front, which means that a glare condition due to the following vehicles is occurring. However, this automatically controlled device is relatively complicated and costly.

Italian patent application T098A000766 filed on Sep. 10, 1998, still secret at the filing date of the present application, has proposed a rear view mirror of the type indicated at the beginning, characterized in that it comprises spring means interposed between the reflective plate and the supporting body tending to hold the reflective plate in said position of normal use, and actuating means for controlling movement of the reflective plate towards the anti-glare position, comprising at least one element made of a shape memory metal alloy, and means for supplying an electric current through this element, so as to heat the element and cause a change of phase thereof which causes the movement of the reflective plate from the position of normal use to the anti-glare position.

In a preferred embodiment of the previously proposed solution, the shape memory element is a wire having one end connected to the mirror supporting body and the other end connected to one end of a lever transmission, whose opposite end is operatively connected to the reflective plate.

SUMMARY OF THE INVENTION

The object of the present invention is that of proposing a new and advantageous solution for providing and arranging the above indicated shape memory element.

According to the present invention, the reflective plate is operatively connected to one pushing rod slidably mounted within the supporting body and having a portion projecting from the supporting body, on the side opposite to the reflective plate. The shape memory element is constituted by a wire having at least one portion resting above the end surface of said projecting portion of the pushing rod and having two opposite ends connected to said supporting body so that said wire portion has a V-shaped configuration with its apex on the projection portion of the supporting rod, whereby a shortening of the wire causes the pushing rod to slide so as to move the reflective plate to its anti-glare position.

In a preferred embodiment, the above mentioned wire is bent in a U so as to have two parallel and adjacent portions arranged according to a V-shaped configuration with the apex located above the end surface of the pushing rod. This configuration has the advantage that the two ends of the wire are located on the same side with respect to the pushing rod and therefore can be connected more easily to a terminal for supplying electric current through the wire. The other end of the V-shaped portion is engaged through a hook secured to the supporting body.

BRIEF DESCRIPTION OF THE DRAWINGS

Further features and advantages of the present invention will become apparent from the following description with reference to the annexed drawings, given purely by way of non limiting example, in which:

FIG. 1 is a perspective view of the whole frame of a rear view mirror according to the invention, FIG. 2 is an exploded perspective view of the structure of FIG. 1, FIG. 3 is a plan view of the structure of FIG. 1, FIG. 4 is a side view of the structure of FIG. 1 with the reflective plate shown in its anti-glare condition, FIG. 5 shows a detail of FIG. 4, and FIG. 6 shows a variant.

DESCRIPTION OF THE PREFERRED EMBODIMENT

With reference to the drawings, numeral 40 generally designates the frame of a rear view mirror for the passenger compartment of a motor-vehicle, comprising a supporting body 41 and a plate 42 (FIG. 2) which on its turn acts a support for the reflective plate (not shown). In the present description and in the following claims, plate 42 is identified in principle as the reflective plate, since it is rigidly connected to the reflective plate. However it is clearly apparent that the invention may be applied both to the illustrated case and to the case in which the plate 42 is the reflective plate itself. To the plate 42 there are secured by screws engaging fixing holes 43 two blocks 44 from which two pivot pins 45 project which are rotatably engaged within holes 46 of two blocks 47 projecting from the front face of the supporting body 41, which is in form of a plate. Two helical tension springs 48 are interposed between pins 49 secured to the supporting body 41 and pins 50 secured to the reflective plate 42, so as to tend to hold the reflective plate in an end position of normal use, shown by dotted lines in FIG. 4, where the plate 42 is substantially parallel to the body 41. Starting from this position, the reflective plate 42 can be rotated around the articulation axis defined by the two pins 45 so as to assume an anti-glare position.

The reflective plate 42 is operatively connected to a pushing rod 50 which is slidably mounted within a through hole 51 of the supporting body. The front end of the pushing rod 50 has a hole 52 for engagement of a transverse pin 53. Pin 53 engages two vertical slots 54 formed a the two opposite sides of a square block 55 which is screwed to the reflective plate 42 and has a vertically elongated cavity 56 within which there is arranged the front end of the pushing rod 50. Due the described arrangement, the rod 50 is operatively connected to the reflective plate 42, whereas the engagement of the transverse pin 53 within slots 54 enables the rod 50 to move properly within hole 51 in synchronism with the pivotal movement of the reflective plate 42 around the articulation axis defined by pins 45.

The pushing rod 50 has a portion 57 projecting from the supporting body 41, on the side opposite to the reflective plate 42 and provided with a collar 58 which is adapted to engage the supporting body 41 to define the end position of the pushing rod 50 towards the reflective plate 42.

As already indicated above, the springs 48 tend to hold the reflective plate 42 in its position of normal use. The reflective plate 42 is moved from this position to the anti-glare position (shown by undotted lines in FIG. 4) due to a movement of the pushing rod 50 towards the reflective plate 42 (i.e. rightwardly with reference to FIGS. 3, 4). This movement is obtained with the aid of a wire made of a shape memory metal alloy, designated by F in the drawings. Wire F has its two ends 59, 60 connected to a connector 61 secured to the supporting body 41, for the supply of electric current through the wire. The wire F is engaged on a hook 62 also connected to the supporting body 41 and located on the side opposite to connector 61, with respect to the pushing rod 50, so that the wire F has two parallel and adjacent portions 63, 64. These portions are engaged within two slots 65 formed on the end surface of the pushing rod 50, so that the two portions 63, 64 assume a V-shaped configuration, with the apex located on the end surface of the pushing rod 50. Due to this arrangement, the passage of electric current through wire F causes heating thereof and a resulting shortening due to the shape memory effect. The shortening of the wire causes a resulting force being applied to the rod 50 which is compelled to move thus causing a corresponding movement of the reflective plate 42 towards the anti-glare position.

When the passage of electric current is interrupted, the wire F cools down and the springs 48 return the reflective plate to its position of normal use.

The passage of electric current through the shape memory wire F can be caused by threatching means which can be controlled directly by the driver or it can be controlled automatically, by providing the rear view mirror with sensor means of the type indicated at the beginning of the present description, in order to automatically activate the current passage any time a glare condition due to the lamps of the following vehicles is detected.

FIG. 6 shows a variant in which the two portions 63, 64 of wire F are embedded within a layer of silicon resin. Studies and tests conducted by the applicant have shown that the use of a coating of this kind decreases the time necessary for cooling the wire F once the electric current supplied thereto is interrupted. This effect is due to that the silicon material has a kind of thermal inertia and then remains relatively cold when the wire is heated due to the current passage, so that it allows a more efficient cooling of the wire when the current is interrupted.

Naturally, while the principle of the invention remains the same, the details of construction and the embodiments may widely vary with respect to what has been described and illustrated purely by way of non limiting example, without departing from the scope of the present invention.

What is claimed is:

1. Motor-vehicle rear view mirror, comprising a supporting body and a reflective plate pivotally mounted onto the supporting body and movable between a position of normal use and an anti-glare position, wherein spring means are provided interposed between the reflective plate and the supporting body tending to keep the reflective plate in the position of normal use and actuating means for driving the movement of the reflective plate towards its anti-glare position, said means comprising at least one element made of a shape memory metal alloy, and means for supplying an electric current through this shape memory element, so as to heat this element and obtain a change of the phase thereof which causes the movement of the reflective plate to its anti-glare position, and wherein said reflective plate is operatively connected to a pushing rod slidably mounted within the supporting body and having a portion projecting from the supporting body on the side opposite to the reflective plate, and that said shape memory element is made of a wire having at least one portion resting above the end surface of said projecting portion of the pushing rod and having its two opposite ends connected to said supporting body so as to have a V-shaped configuration with the apex on the end surface of the projecting portion of the pushing rod, so that a shortening of the wire causes a sliding movement of the pushing rod which causes the movement of the reflective plate to its anti-glare position.

2. Rear view mirror according to claim 1, wherein the wire is bent in a U so as to have two parallel and adjacent portions having a V-shaped configuration with the apex located above the end surface of the pushing rod, with the two ends of the wire located on the same side with respect to the pushing rod and connected to a connector, and a hook connected to the supporting body on the opposite side of the pushing rod for the arrangement of the wire with a U-turn.

3. Rear view mirror according to claim 1 wherein the wire is embedded within a layer of silicon resin.

4. Rear view mirror according to claim 2, wherein the wire is embedded within a layer of silicon resin.

* * * * *